United States Patent [19]

Reeves

[11] 4,064,970
[45] Dec. 27, 1977

[54] CONVEYOR LUBRICATING APPARATUS

[76] Inventor: Gordon P. Reeves, 2519 43rd St., SW., Grand Rapids, Mich. 49509

[21] Appl. No.: 556,973

[22] Filed: Mar. 10, 1975

[51] Int. Cl.$^2$ ............................................. F16N 7/34
[52] U.S. Cl. ............................. 184/15 B; 184/56 A; 184/29
[58] Field of Search ............... 184/56 A, 15 R, 15 A, 184/15 B, 37, 55 R, 27 R, 61, 3 R, 3 A, 6.26; 239/146, 174; 63/624.1, 624.18, 624.13

[56] References Cited

U.S. PATENT DOCUMENTS

| 784,049 | 3/1905 | Hultquist | 184/56 A |
|---|---|---|---|
| 2,658,585 | 11/1953 | Klein et al. | 184/15 A |
| 3,135,355 | 6/1964 | Olsen et al. | 184/15 R |
| 3,245,621 | 4/1966 | Thomas | 184/56 R X |
| 3,481,431 | 12/1969 | Dorsey | 184/56 R |
| 3,729,024 | 4/1973 | Harrah | 137/624.13 |
| 3,760,904 | 9/1973 | Luthar | 184/3 R |
| 3,785,456 | 1/1974 | McIntire et al. | 184/15 R X |

Primary Examiner—Richard C. Pinkham
Assistant Examiner—William R. Browne
Attorney, Agent, or Firm—McGarry & Waters

[57] ABSTRACT

A conveyor lubricator for lubricating moving parts in a conveyor mechanism comprises an air operated oil injector that dispenses a measured quantity of oil on each part to be lubricated when such part reaches a predetermined position on the track; an air assist mechanism that generates an air flow across the oil outlet so as to urge the oil toward said predetermined position; and a cam operated actuator valve that provides air pressure to actuate the oil injector and air assist whenever a moving part reaches said predetermined position. A timed pulse valve connected to the actuator valve automatically deactivates the air flow after a predetermined period of time, even if the actuator valve still remains actuated by continued engagement with the conveyor. More than one cam operated actuator valve can be employed in the system in order to provide lubrication for an increased number of moving parts of the conveyor mechanism with a single set of oil injectors. The cam operated actuator valve includes an adjustment mechanism that permits placement of the valve in different positions. The lubricator also can include a selective actuation mechanism in order to actuate and deactuate the system whenever desired. An air counter can be employed to automatically actuate and deactuate the system at regular intervals.

26 Claims, 19 Drawing Figures

CONVEYOR LUBRICATING APPARATUS

BACKGROUND OF THE INVENTION

1. The Field Of The Invention

This invention relates to conveyor lubricators and more particularly to an automatic conveyor lubricator that deposits a predetermined quantity of oil on each part to be lubricated and provides an air assist for conveying the oil to the part.

2. Description Of The Prior Art

An overhead conveyor mechanism typically comprises a series of wheeled trolleys that ride along a fixed track following a predetermined path, with the trolleys being interconnected by a chain formed of a number of interconnected solid links. There are a number of moving parts in the conveyor assembly itself, principally, the wheels on the trolleys and the pins interconnecting the links of the chain. All of these parts require periodic lubrication.

These parts can be lubricated by hand, but this is a time consuming and laborious process, and the frequency with which lubrication is required makes lubrication by hand an expensive undertaking. Also, lubrication by hand is an imprecise method of lubricating a part and often causes the deposit of too much lubrication on the moving parts. This excess lubrication can drip from the conveyor, and with an overhead conveyor, such dripping can fall onto the part being conveyed by the conveyor. If the part is being conveyed for a painting or other finishing operation, the presence of oil on the part can cause the part to be rejected. Thus, it is desirable to lubricate each part at regular intervals and precisely enough to provide just enough lubrication for the moving components of the conveyor.

A number of automatic lubricating devices have been devised for conveyor assemblies, with most lubricating devices being designed specifically for overhead conveyors, where excess lubrication drippage is most undesirable. These devices have included apparatus for applying grease to lubrication fittings on the part and to oiling devices for supplying oil to exposed components of the assembly.

Several different types of devices have been employed for applying oil to conveyor linkages. One type is simply a mechanical pumping device that discharges a quantity of oil from a nozzle onto a component of the conveyor whenever the mechanism is actuated by a trolley tripping an appropriate actuating valve. The problem with a purely mechanical lubricating device is that it is difficult to position the nozzle close enough to the part to insure that the oil is deposited directly on the part to be lubricated. Also, because of the surface tension of the oil, a portion of the oil tends to remain as a droplet on the end of the outlet nozzle. This oil collects dirt and dust and may fall at a later time onto a part conveyed by the conveyor.

Another type of oil lubricating device is called a spray or mist type of lubricator. In this type of system a jet of air is directed on the part to be lubricated and a Venturi device in the conduit conveying the air to the part is employed to draw oil into the stream of air being blown against the part. The result of this type of device is that oil is generally sprayed as a fine mist all over the part and is not conveyed with any accuracy to the particular location needing lubrication. This spray also can settle on the parts passing below the lubricator, causing rejection of the parts. Also, the inaccuracy of the spray prevents the complete lubrication of the part and thus requires additional and excessive lubrication in order to properly lubricate the part. The additional lubrication necessary causes additional deposits of oil on the parts.

Another way of lubricating conveyor chains is to apply lubrication to the chain with a brush or other similar applicator dipped in oil and having the brush engage the conveyor chain as it passes. They type of apparatus also results in inaccurate lubrication of the parts and a deposit of excess oil on the conveyor assembly.

Another disadvantage with prior art conveyor lubricators that contributes to the problem of oil dripping on the parts carried beneath the conveyor is that these lubricators are not capable of depositing a sufficiently small amount of lubrication on each part requiring lubrication. Rather, the prior art lubricators are somewhat crude and deposit substantially greater quantities of oil than are required.

SUMMARY OF INVENTION

In accordance with the present invention, an improved conveyor lubricator causes the deposit of a measured amount of oil on each moving part of a conveyor and provides an air assist to carry the oil directly to each part requiring lubrication and to remove excess oil and dirt from the outlet nozzle of the lubricator.

In the conveyor lubricator of the present invention an air-operated oil dispensing device dispenses a measured quantity of oil on each part when such part reaches a predetermined position on the track. The oil dispensing device delivers oil to an oil outlet at the predetermined position by positive displacement of the oil. An air assist device directs an air flow over the oil outlet and toward said predetermined position, such that oil dispensed from the oil outlet is urged by the air flow to said predetermined position. An actuator mechanism in the lubricator causes the oil dispensing device to dispense a measured quantity of oil from the oil outlet each time a part reaches said predetermined position. It also causes the air assist device to commence an air flow across the oil outlet each time oil is dispensed from the oil outlet. The actuator mechanism automatically stops the air flow after a predetermined time.

In the present invention, the actuator mechanism comprises a cam actuated air valve which is actuated by the movement of the conveyor mechanism along the track. When a part reaches its predetermined lubricating position, the cam engages the conveyor mechanism and actuates the air valve so that it transmits air pressure through a timed pulse valve to the oil dispensing and air assist devices (which are incorporated in a single unit called a meter valve). The timed pulse valve permits air to flow to said devices only for a predetermined period of time, and then it shuts off the air flow automatically. The advantage of this feature is that if the conveyor assembly is stopped while the cam is holding the air valve in an actuated position, the timed pulse valve will nonetheless permit only a fixed duration pulse of air to pass through the valve before the air flow is automatically shut off. This prevents air from continuously being passed through the system if the conveyor assembly is ever shut off with the cam actuated air valve in an actuated position.

The cam actuated air valve of the present invention is a normally closed three-way valve that is mechanically actuated by the rotation of a cam arm upon engagement with a moving component of the conveyor mechanism.

The rotation of the cam arm causes a cam plate to engage and reciprocate a plunger that actuates the valve.

One of the important features of the present invention is that the plunger includes an adjustment mechanism for varying the length of the plunger and thereby varying the amount of cam rotation required before the cam will actuate the valve.

One reason why this is desirable is because it permits variation in the position of the valve for mounting purposes. In the preferred practice of the present invention, the valve body is threaded into a housing that contains the plunger, and the housing is mounted on a mounting plate. The valve body has an outlet port extending out of the side of the body, and this outlet port must be positioned so that it does not extend toward the mounting plate; otherwise it will interfere with the mounting plate. The position of the outlet port can be changed by rotating the valve body in the housing, but this causes axial movement of the valve body with respect to the plunger. To compensate for this, the effective length of the plunger is adjusted to maintain the correct plunger stroke to actuate the valve.

In the preferred practice of the present invention, the oil dispensing device is an air-operated oil injector or meter valve, wherein an air-driven plunger is mounted for reciprocal movement into and out of an oil-filled chamber. The movement of the plunger into the oil filled chamber causes the displacement of a measured quantity of oil from an outlet in the chamber. The stroke of the plunger is adjustable in order to vary the quantity of oil displaced from the chamber from a minimum of about 1/45th of a drop of oil to the maximum of about one drop of oil.

The use of this type of oil dispensing mechanism is advantageous in that it provides a means for positively dispensing an accurately measured quantity of oil on each reciprocation of the plunger. Further, this type of valve limits the dispensation of oil to a single reciprocation of the plunger each time the plunger is driven by the receipt of pressurized air. The air pressure can be maintained on the plunger for any amount of time, yet the plunger still dispenses but a single measured quantity of oil. It is only when the air pressure is relieved that a resilient biasing means in the injector returns the plunger to its original position so that the plunger can be reactivated to displace a second measured quantity of oil from the valve mechanism.

In the preferred practice of the present invention, the oil injector and air assist mechanisms are combined in a single valve unit, which is commercially available. In such a unit, the oil and air are conveyed to the lubricating location in a coaxial conduit with the oil being conveyed in the inner conduit and the air being conveyed in the outer conduit.

In lubricating a conveyor system, one valve unit is provided for each moving part lubricated in each trolley section. A single valve unit is supplied for each wheel on the trolley, and separate valve units are provided for the chain pins interconnecting the wheeled trolleys. A single oil supply reservoir and a single source of pressurized air operate all of these valves, with the oil supply operating under the force of gravity.

In order to avoid the necessity of having separate valve units for each chain pin in the chain connecting the wheeled trolleys, a second actuating device can be employed so that one set of valve units can be employed for lubricating separate sets of chain link pins in a series.

To lubricate the trolley wheels, the cam arm of the actuator valve is positioned for actuating engagement with the wheels of the trolley as they move along the track. As each wheel engages the cam arm, the lubricating means is actuated to inject lubrication in the bearings of the wheel. At the same time, additional valve units may be actuated to lubricate chain pins in the portion of the chain adjacent the wheel.

The present lubricating device can also be employed for the purpose of lubricating only chain pins. For this purpose, it is preferred that the cam roller valve be positioned so that it is actuated by contact with individual links on the chain. When individual links on the chain contact and actuate the cam roller valve, any number of separate lubricating units can be actuated to lubricate the desired links in the chain. When the present invention is used to serve as a chain pin lubricator, it is only necessary to have two lubricating units and a single actuating valve. Since each chain link has two chain pins, the actuation of the cam roller valve by each solid chain link as it moves along can serve to actuate two lubricating units positioned to lubricate the chain pins for a single link reaching a predetermined position on the track. The actuation of these lubricating devices will occur each time each solid link reaches the predetermined position, so all chain pins will be lubricated.

When the lubricator is used for lubricating chain pins, the cam actuator and the oil outlet nozzles can be mounted on a pivotable framework that can be pivoted into and out of engagement with the chain links. An adjustment mechanism in the framework permits position adjustment of the lubricator nozzles and cam actuator in transverse, longitudinal and vertical directions.

In some applications it is not desirable to lubricate the chain pins and trolley wheels on every cycle of the conveyor mechanism around the track. One of the features of the present invention is the provision of a mechanism to deactuate the lubricating device when lubricating is not desired. This is accomplished in the present invention by mounting the cam roller valve in a slidable track so that it can be moved into and out of engagement with the desired actuating component of the conveyor mechanism. A resilient biasing mechanism is employed to urge the actuating valve out of engagement with the conveyor mechanism, and an air pressure actuating device is employed to overcome the biasing force and selectively move the actuator into a position for actuating engagement with the moving conveyor.

In order to precisely control the frequency with which the lubricating device is actuated and deactuated, an air counter or similar counting device can be employed in order to automatically actuate and deactuate the lubricating device at any frequency desired. A pneumatic AND gate can be employed in connection with the air counter to actuate and deactuate the lubrication mechanism, instead of the slidable track.

These and other advantages and features of the present invention will hereinafter appear, and for purposes of illustration, but not of limitation, preferred embodiments of the present invention are described in detail below and shown in the attached drawings.

DETAILED DESCRIPTION OF PREFERRED EMBODIMENT

Figure 1:
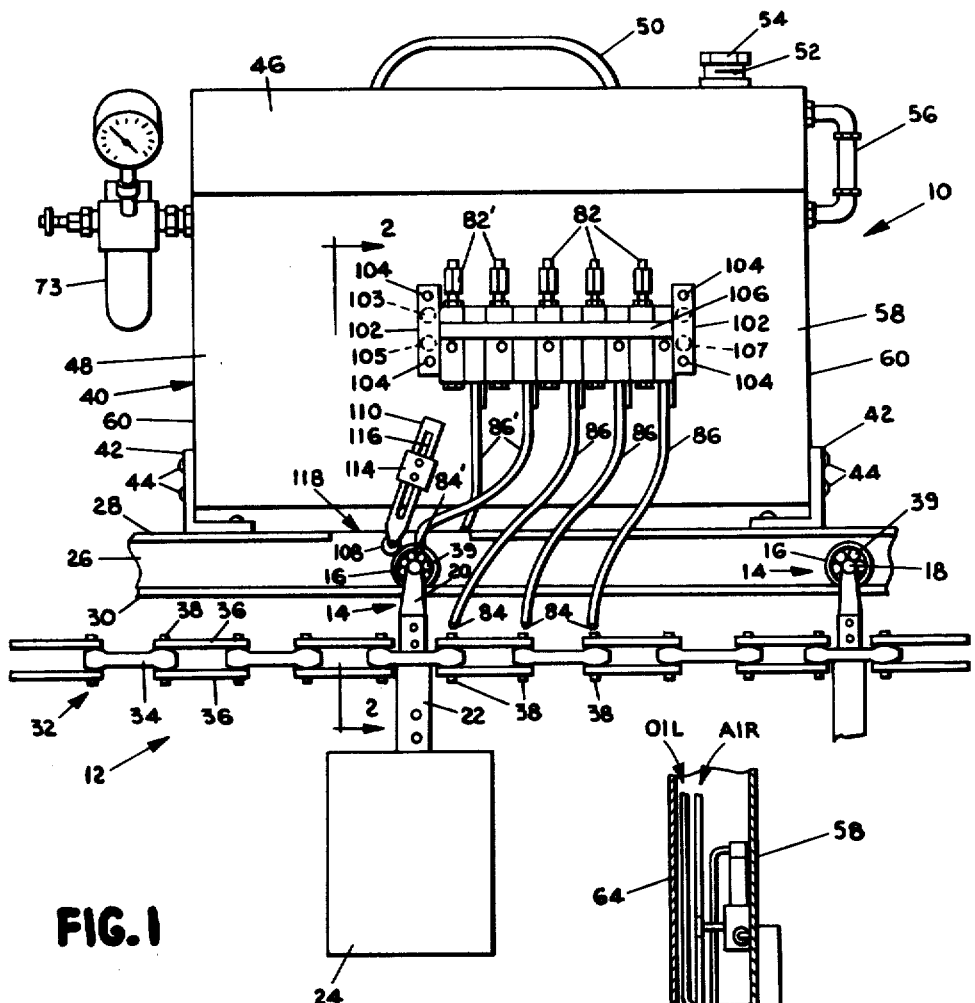
FIG. 1 is a front elevational view of the lubricating device of the present invention.
Figure 2:
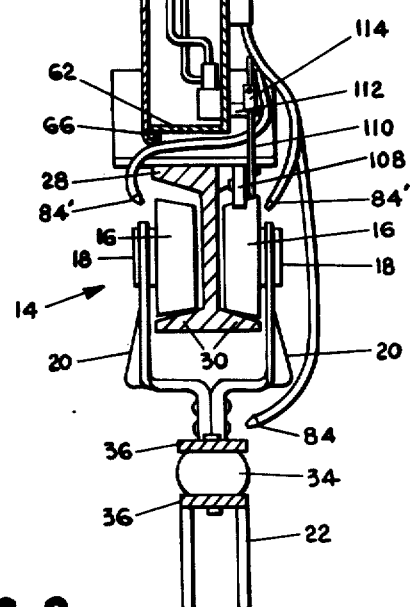
FIG. 2 is a sectional view taken along lines 2—2 of FIG. 1.

Referring now to the drawings, a lubricating device 10 constructed in accordance with the present invention is shown and described herein for exemplary purposes in the manner in which it would be employed in providing automatic lubrication for an overhead conveyor 12. It should be understood that this description is exemplary only and that the present invention could also be employed in providing lubrication for any other type of conveyor mechanism wherein automatic lubrication of movable components is desirable. The present invention is described in the context of an overhead conveyor because the problems attendent to poor lubrication and oil dripping are particularly prominent in that type of conveyor. Parts are conveyed below an overhead conveyor and oil dripping from the conveyor links and trolley wheels is likely to fall on the parts being conveyed. Since such parts could be in the process of being painted or having some other finish applied to them, the presence of oil or dirt or other impurities on the products could seriously impair the finish and cause the part to be rejected. Thus, an accurate and efficient automatic lubricating device is of special significance in this type of conveyor.

In the exemplary embodiment shown herein, conveyor 12 comprises a series of wheeled trolleys 14 comprising wheels 16 mounted on axles 18. Axles are attached at outer ends thereof to a yoke 20 which extends downwardly from the wheels to a supporting arm 22 which is attached to an object 24 being carried by the conveyor along a predetermined path from one position to another.

The wheeled trolleys of the present invention ride along outer flanges of an I-beam 26, which defines the predetermined path to be followed by the conveyor. I-beam 26 comprises outwardly extending flanges 28 on the top and outwardly extending flanges 30 on the bottom. One wheel 16 rides on each of the outwardly extending flanges on the bottom of the I-beam. The path is usually a closed loop or circuit.

The wheeled trolleys 14 are interconnected by a link chain 32 comprising a series of solid links 34 and plate links 36 spaced on each side of the solid links. Chain pins 38 interconnect the solid links with the plate links at the ends thereof.

In the above described conveyor mechanism, frictional engagement of moving parts is encountered in the bearings 39 of wheels 16 and in the chain pins 38 of the connecting chain. These parts require periodic lubrication as the conveyor mechanism is continuously moved in cycles about the track defined by I-beam 26. The amount of lubrication needed by the chain pins may be different from the amount of lubrication needed by the bearings in the wheels, and the amount of lubrication needed by the entire assembly may vary depending upon the manner in which the conveyor mechanism is employed. For example, if the conveyor mechanism is simply employed to carry parts from one station to another, a relatively low frequency of lubrication may be satisfactory. On the other hand, if the conveyor mechanism is employed for carrying parts through a furnace or through a detergent solution, the conveyor may have to be lubricated more frequently. The present invention provides for proper lubrication adjustment in all such situations.

Lubrication device 10 of the present invention comprises a housing 40 mounted on top of I-beam 26 by means of angle brackets 42 at each end of the housing. Angle brackets 42 are attached to the housing and I-beam by bolts 44 or the like. Housing 40 comprises a two gallon oil reservoir 46 mounted on the top of a closed rectangular compartment 48, which contains the lubricating components of the system. A handle 50 is mounted on the top of the reservoir and a fill opening 52 covered by a removable cap 54 provides an opening for supplying lubrication to the reservoir. Sight gage 56 indicates the level of the oil in the reservoir. The reservoir is mounted on top of the lubricating components in the system so that oil is supplied to the various components in the system by means of gravity flow.

Figure 3:
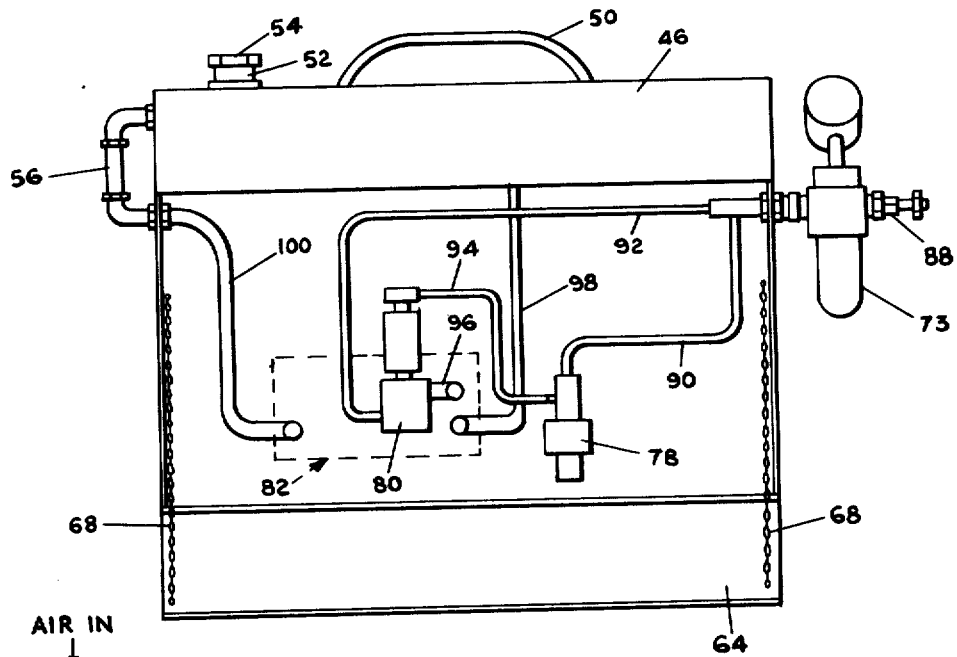
FIG. 3 is a rear elevational view of the lubricating device of the present invention, shown with the access door open.

Compartment 48 provides a main support plate 58 extending parallel to the I-beam and upwardly therefrom. End walls 60 and a bottom wall 62 are attached at right angles to support plate 58. A door 64 is hinged at a lower edge 66 to bottom plate 62 and serves to cover the interior of the lubricating device. Door 64 opens downwardly to a generally horizontal position (as shown in FIG. 3) and is held in this horizontal position by means of chains 68 or other suitable holding device. When the door is in this lowered position for servicing the lubricating device, the door will also serve as a table for the workman, on which he can place his tools and any components being serviced. This is a desirable feature of the present invention.

Figure 6:
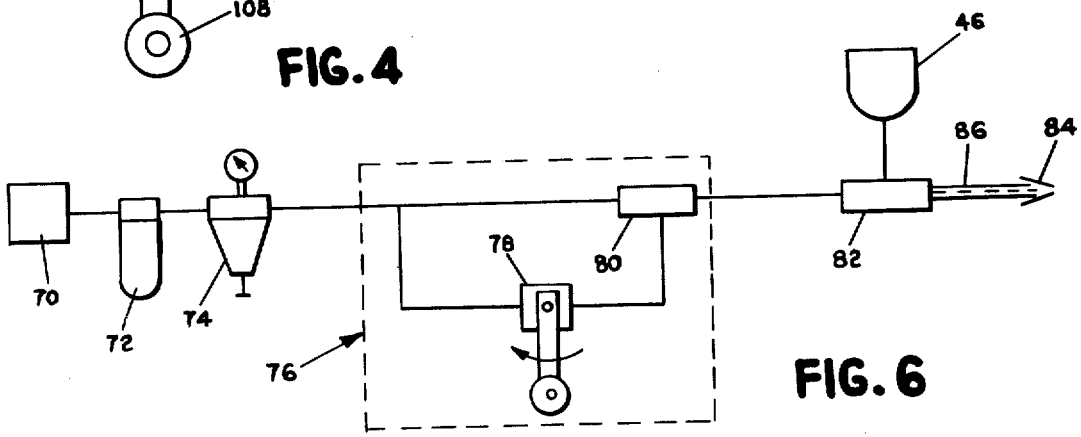
FIG. 6 is a schematic block diagram of the pneumatic and hydraulic systems of the present invention.

The components of the lubricating device of the present invention are shown schematically in FIG. 6. An air supply source 70 provides pressurized air through a filter 72 and an air pressure regulator 74 to an actuator valve mechanism 76, which controls the actuation of the lubricating device. Actuator valve mechanism 76 comprises an air operated pilot valve in the form of a cam roller valve 78 and a timed pulse operator valve 80. When pilot valve 78 is actuated, operating air pressure is provided through operator valve 80 to an oil dispensing valve 82 in the form of a meter valve. Oil dispensing valve 82 receives oil from oil reservoir 46 by gravity flow and is operated by air pressure to deliver the oil in predetermined amounts to the part being lubricated. Oil is delivered by valve 82 to each part of the conveyor by a conduit 86 that leads to a nozzle 84 mounted on the outlet of conduit 86. Conduit 86 is a coaxial conduit and is adapted to convey both oil and pressurized air to outlet nozzle 84. When the actuator valve mechanism 76 is actuated, a measured amount of oil is discharged from nozzle 84 and at the same time air flows through the outer conduit of coaxial conduit 86 and is emitted also from nozzle 84. This pulse of air assists in conveying the oil being discharged from nozzle 84 to the part being lubricated in the conveyor. The pulse of air also removes any remaining oil and dirt from the nozzle, thus preventing oil dripping and dirt accumulation on the nozzle. Without an air assist of this type, the conveyance of oil from the outlet nozzle to the part to be lubricated is less accurate, and the surface tension of the oil causes a small residue of oil to remain on the outlet nozzle after the oil had been discharged. This residue of oil collects dirt and also is likely to fall off the nozzle onto a part being conveyed by the conveyor.

The individual components of the lubricator of the present invention are shown in more detail in FIG. 3. The air supply provides air to the inlet 88 of a filter-regulator 73, which includes filter 72 and regulator 74. Regulator 74 is adjustable in order to vary the pressure of the air provided to the system. After the air passes through filter-regulator 73 the air is divided into two paths. One path leads through a first conduit 90 to air pilot valve 78. A second conduit 92 conveys pressurized air to timed pulse valve 80. An air supply conduit 94 interconnects pilot valve 78 and timed pulse valve 80. Pneumatic conduit 96 conveys pressurized air from timed pulse valve 80 to the oil dispensing valves 82 (which are mounted on the outside of compartment 48).

Oil is supplied to oil dispensing valves 82 by means of conduit 98 extending downwardly from reservoir 46, with a return conduit 100 leading back to the tank through sight gage 56.

The oil dispensing mechanism of the present invention is shown in FIG. 1. In that figure, a series of five identical oil dispensing valves 82 are shown, with each valve providing its own outlet conduit 86 and having its own outlet nozzle 84 adjacent a desired part to be lubricated. Oil dispensing valves 82 are mounted together on the outer surface of the mounting plate 58 by means of a pair of mounting blocks 102 which are bolted by suitable fasteners 104 to the surface of the mounting plate. A tie rod 106 connects the mounting blocks and holds the oil dispensing valves tightly between the mounting blocks. In FIG. 1, the two oil dispensing valves on the left, designated by numeral 82', are employed for the purpose of lubricating open race bearings 39. The outlet nozzles 84' of these oil dispensing valves are positioned immediately adjacent to each of the bearings, with one outlet conduit 86' lubricating the wheel on one side of the I-beam and the other outlet conduit 86' extending underneath housing 40 to lubricate the wheel on the other side of the I-beam. The remaining three oil dispensing valves are positioned to lubricate the first three chain pins behind the trolley wheels that are lubricated by oil dispensing valves 82'.

Air and oil are supplied to the five oil dispensing valves through openings 103 and 105 respectively in one of the mounting blocks 102. An oil return is provided through opening 107 in the other mounting block. In FIG. 1, the air and oil inlets are connected to the mounting block at the left end of the oil dispensing mechanism and the oil return is connected to the mounting block at the right end of the series of oil dispensing valves. In order to provide oil and air to all the valves through the mounting blocks, all the valves are connected together so that air and oil supplied to one of the valves are supplied to all the valves at substantially the same pressure.

As shown in the drawings, the oil outlet nozzles 84 and 84' are held in a fixed or predetermined position with respect to the track on which the conveyor system runs. In order to lubricate the various parts of the system, it is necessary that each part be in a predetermined position adjacent its respective oil outlet nozzle when lubrication is dispensed from this nozzle. The means for causing dispensation of oil at the exact time when the parts are in their predetermined position is air valve 78. Valve 78 is a mechanically actuated cam roller valve that delivers air pressure to timed pulse valve 80 whenever it is actuated. Valve 78 is actuated by cam roller 108 rotatably mounted on the end of a cam arm 110, which is attached at right angles to a pivotable shaft 112 that extends through support plate 58 into the interior of the housing. Cam roller arm 110 is attached to pivotable shaft 112 by means of a bracket 114, which is slidably mounted on arm 110 by means of a slot 116 in the arm. This permits the arm position to be raised or lowered with respect to the conveyor mechanism on the track. In the preferred embodiment of the present invention, the position of the cam roller 108 is adjusted so that the cam roller arm pivots through an arc of about 20 degrees between a deactuated and actuated position when the trolley on the conveyor mechanism engages the roller 108 on the end of the arm. A cut-out section 118 is provided in the upper flange of the I-beam so that the cam roller arm can extend downwardly from the lubricating device to an engaging position with respect to the trolley on the conveyor mechanism.

Figure 4:
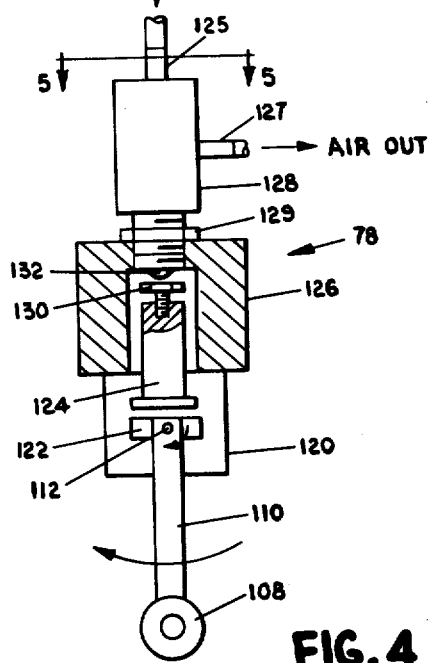
FIG. 4 is a partially sectional, schematic view of the air pilot actuator valve of the present invention.
Figure 5:
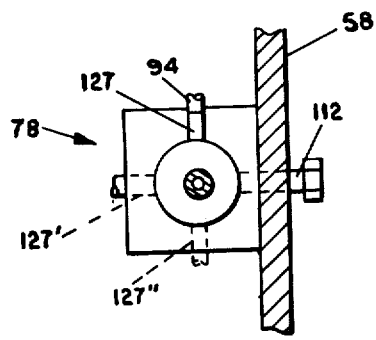
FIG. 5 is a view taken along lines 5—5 of FIG. 4.

The details of the cam actuating mechanism for the air valve are shown in schematic form in FIGS. 4 and 5. Pivotable shaft 112 extends from an outer end attached to arm 110 to an inner end extending into the interior of compartment 48 in a housing 120. The end of shaft 112 inside housing 120 is attached to a cam plate 122 that pivots with the rotation of shaft 112. When cam plate 122 is pivoted, it engages an adjacent surface of an outwardly spring biased cam follower or plunger 124 and causes cam follower 124 to reciprocate within a separate housing 126 mounted on top of housing 120. Housing 126 is threaded onto the end of a three-way valve 128 (which is the actual valve element of valve mechanism 78). A lock nut 129 holds the valve in any given axial position in the end of housing 126. An adjustment screw 130 is mounted on the inner end of plunger 124 in order to vary the thrust of the plunger in actuating the three-way pilot valve. The three-way valve is actuated by engagement of screw 130 with a button 132 on the three-way valve. A resilient biasing means 134 (shown schematically in FIGS. 7 and 8) urges valve 128 to its normally closed position, and spring means 135 urges plunger 124 to its outward position. The three-way valve has an air inlet 125 port and an air outlet port 127, with the outlet port extending from the side of the valve body.

One important feature of the particular structure of the mechanically actuated cam roller valve of the present invention is that the adjustment screw 130 on the end of cam follower 124 provides a means for varying the position of the air outlet port 127 of air pilot valve 128. As shown in FIG. 5 the cam roller valve 78 is mounted on support surface 58, with outlet port 127 extending outwardly from the side of the valve parallel to support surface 58. In certain circumstances, it may be desirable to be able to change the position of outlet port 127 to other positions, for example, the positions designated by ports 127' and 127'', as shown in FIG. 5. It is desirable of course that outlet port 127 not extend directly toward support plate 58. In order to position outlet port 127 at any desired position with respect to support plate 58, it is necessary to rotate valve 128 in the threaded opening in mounting block 126. Because of the threaded connection, the rotation of valve 128 causes a longitudinal movement of the valve with respect to mounting block 126. This longitudinal movement increases or decreases the distance between the cam follower and the button 132 on the valve, and this in turn causes a change in the required stroke of the cam follower in order to actuate the valve. In the present invention, the stroke of the cam follower must be adjusted quite closely so that the valve will be fully opened by the pivotable movement of the cam roller when engaging the wheel on the conveyor system. In order to compensate for the longitudinal changes that might be encountered by rotating valve 128 with respect to mounting block 126 and also to provide adjustment for various circumstances and equipment and to compensate for any wear that might be encountered in the cam mechanism itself, the threaded adjustment screw 130 provides a means for increasing or decreasing the effective length of cam follower 124.

Figure 7:
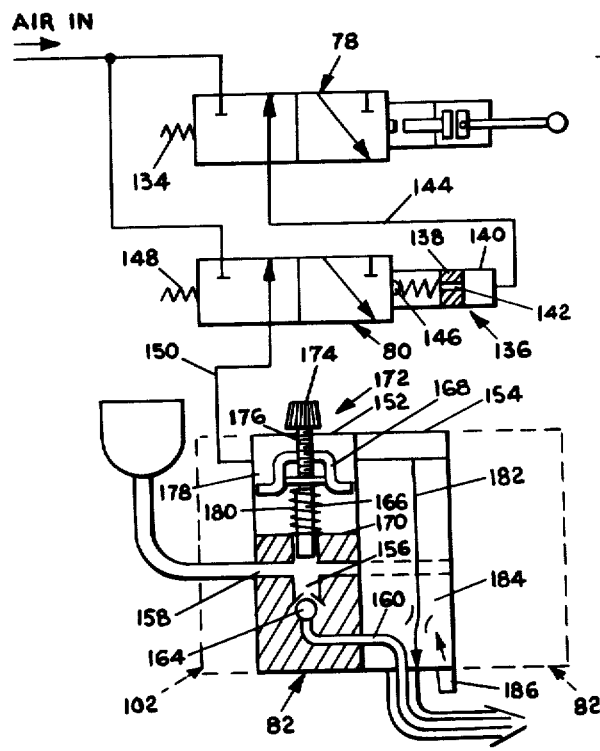
FIG. 7 is a schematic diagram showing the air valve as a three-way valve and showing its connections to the timed pulse valve and meter valve elements of the present invention.
Figure 8:
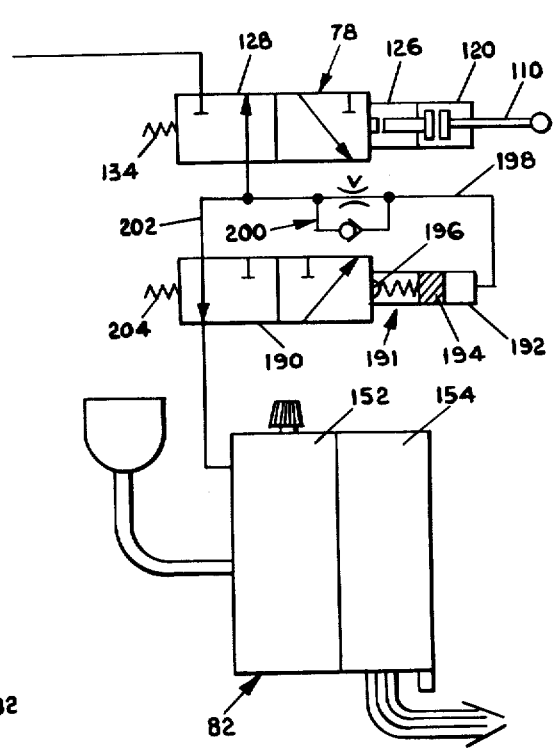
FIG. 8 is a schematic drawing showing a second embodiment of an air valve, timed pulse valve, and meter valve employed in the present invention.
Figure 14:
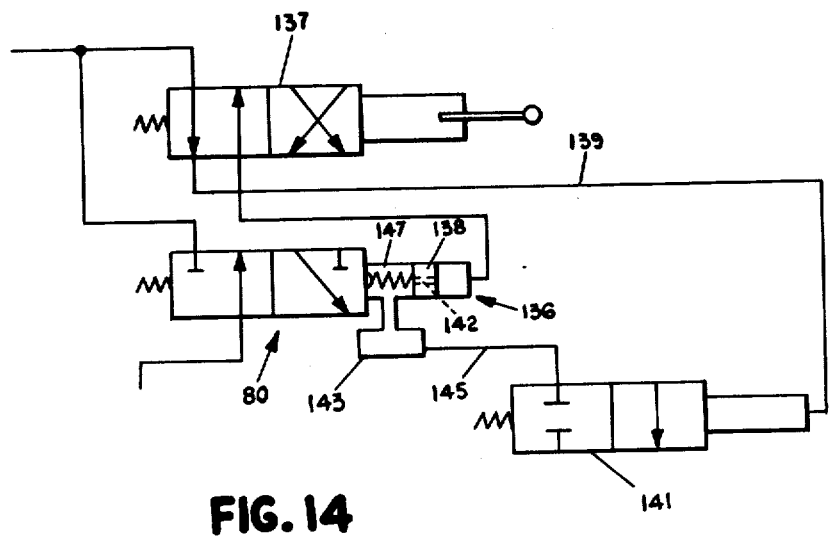
FIG. 14 is a schematic block diagram showing a third embodiment of an air valve and timed pulse valve arrangement.

The hydraulic and pneumatic circuits of the present invention, insofar as they involve the components of the actuator valve mechanism and the oil dispensing mechanism are shown in FIGS. 7, 8, and 14 with FIGS. 8 and 14 representing alternative embodiments to the hydraulic and pneumatic circuit shown in FIG. 7. Referring to FIG. 7, the air valve 78 serves as a pilot valve and is connected in parallel with timed pulse valve 80, with both valves being normally closed. The actuation mechanism for the timed pulse valve is a timed actuator 136, which comprises a piston 138 slidably mounted in a hollow chamber 140, with piston 138 including a small opening 142 therein. When air valve 78 is actuated by pivoting cam arm 110, pressurized air is provided to the right hand side (FIG. 7 orientation) of chamber 140. The pressurized air introduced to the right hand side of chamber 140 causes piston 138 to move to the left until it engages actuating button 146 of valve 80 and causes valve 80 to open. The air pressure holds the valve in an open position until the passage of air through opening 142 equalizes the pressure on each side of the piston sufficiently so that resilient biasing means 148 overcomes the force of the piston and returns the valve to its normally closed position.

While the valve is open, air pressure is supplied through a conduit 150 to oil dispensing valve 82. In FIG. 7, only a single oil dispensing valve is shown in detail, with this valve being shown in position between mounting block 102 and a second oil dispensing valve 82.

As shown in FIG. 7, oil dispensing valve 82 includes two sections, a left hand section 152 for dispensing predetermined quantities of oil from the oil dispensing valve, and a right hand section 154 for conveying pressurized air to the outlet nozzle of the oil dispensing valve along with the measured quantities of oil. The left hand section of the valve includes an oil chamber 156 which receives oil through inlet 158 and discharges oil through outlet 160. Check valve 164 may be employed in order to insure that oil cannot pass inwardly through outlet 160.

Oil is ejected through outlet 160 by means of an oil piston 166 which is mounted for reciprocation into and out of oil chamber 156. An air piston 168 bearing against the upper end of oil piston 166 controls the stroke of the piston into the oil chamber, with the stroke being limited to the distance between air piston 168 and a shoulder 170 on the outer side of the oil chamber. After air piston 168 is moved into contact with shoulder 170, the oil piston can move no further into the oil chamber. The amount of oil displaced from the outlet is equal to the volume of oil displaced by the movement of the piston into the oil chamber. In order to vary the amount of oil displaced from the outlet, a mechanical adjusting mechanism 172 is provided in order to vary the distance oil piston 166 extends below air piston 168. Adjustment mechanism 172 includes a manually adjustable knob 174 and a shaft 176 that is threaded through the upper end of air piston 168. Threaded shaft 176 bears against oil piston 166 in order to vary its position with respect to the air piston.

Piston 166 is reciprocated into oil chamber 156 by means of air introduced into air chamber 178 at the outer surface of air piston 168. When pressurized air is introduced into air chamber 178, the pressurized air causes the piston to move downwardly (FIG. 7 orientation) into the oil chamber, thus displacing oil from the outlet. When the pressure in the air chamber 178 is relieved (which occurs when valve 80 returns to its closed position) a resilient biasing means or spring 180 urges the piston out of the oil chamber. This permits additional oil to flow into the oil chamber, thus readying the oil dispensing valve for subsequent ejection of a measured quantity of oil.

The important feature of the oil dispensing valve of the present invention is that oil is dispensed from this valve by positive displacement of a precisely measured quantity of oil, and the valve operates to discharge this quantity of oil only once every time the valve is actuated. The amount of oil dispensed from this valve is independent of the amount of time the air pressure is applied to air chamber 178. The importance of this feature is that the speed of the trolley has no effect on the amount of oil dispensed from the outlet nozzle. Also, the amount of oil dispensed from the outlet nozzle will not vary, even if by chance the conveyor mechanism is turned off at the end of the work day with the lubricator actuator held in its "on" position. In most prior lubricating devices, the amount of oil deposited upon a part is dependent upon the length of time the actuator remains actuated. Thus, the amount of oil that a part receives varies with the speed of the conveyor mechanism, and the oil could conceivably be left on all night if the conveyor mechanism would be turned off with the lubricator in its "on" position.

Another important feature of the present invention is the use of an air assist means in assisting the dispensation of measured quantities of oil from the outlet nozzle. This air assist means is provided by section 154 connected to the oil dispensing valve. Section 154 is an air manifold which receives air pressure from air chamber 178 through conduit 182. Conduit 182 includes air pressure regulator 184 which is manually adjustable by means of a knob 186 on the outside of section 154. This provides a means for independently adjusting the air flow for each oil dispensing valve.

As described above, the outlet of the oil dispensing valve comprises a coaxial conduit 86, with oil being conveyed in the inner conduit and air being conveyed in the outer conduit. A single nozzle 84 is provided at the outlets of both conduits in order to direct both air and the oil at the part to be lubricated. Nozzle 84 is constructed so that the air flow through the outer conduit is directed over the outlet of the oil conduit as it passes through outlet nozzle 84. This flow of air over the outlet of the oil conduit causes the oil to be entrained in the air and carried positively to the part to be lubricated. This air assist also prevents oil from being retained at the end of the outlet because of the surface tension of the oil. Without an air assist, some oil may be retained on the oil outlet, and this oil can drip from the nozzle onto parts conveyed below the conveyor mechanism. Also, without an air flow across the oil outlet, dirt and dust can collect on the oil outlet, thus causing clogging of the oil outlet. The air assist conveys both the excess oil and the dirt and impurities from the oil nozzle, thus maintaining a clean and operative oil outlet.

The particular type of oil dispensing valve and air assist assembly employed in the present invention is commercially available as a single unit sold by Uni-Mist Inc., Grand Rapids, Michigan. The commercial unit includes the oil dispensing mechanism, the adjustable air assist mechanism, the coaxial conduit and the outlet nozzle.

Another important feature of the present invention is the use of a timed pulse valve in connection with the oil dispensing valve and the air assist mechanism of the present invention. Although the oil dispensing valve of the present invention will dispense only a single measured quantity of oil each time the valve is actuated, the air assist mechanism remains in the "on" position until the air flow to the air assist valve is shut off. In the situation where the conveyor assembly is stopped at a point where the cam actuated valve is left in an "on" position, without a timed pulse valve, the air flow would remain on until the conveyor mechanism was turned back on and moved until the cam actuator became deactuated. With the timed pulse valve of the present invention, the amount of time the air flow remains on is limited by the timed pulse valve, and the air flow is automatically cut off after a predetermined amount of time, regardless whether the cam actuator remains in its actuated position after that time. This is an important safety feature of the present invention.

Another type of timed pulse valve mechanism is shown in FIG. 8. In this embodiment, a normally open timed pulse valve 190 is connected in series with actuator valve 78, which is the same as in the embodiment shown in FIG. 7. Since valve 190 is normally open, when valve 78 is opened by actuation of the cam mechanism, air flows directly from valve 78 through valve 192 to oil dispensing valve 82. The time duration of the air pulse through valve 190 is controlled by means of an air operated timed deactuation mechanism 191 mounted on the valve. Deactuation mechanism 191 comprises a cylinder 192 and a piston 194 that is slidable in the cylinder from a deactuated position shown in FIG. 8 to an actuated position wherein the piston engages an actuating button 196 on the valve and moves the valve to its closed position. Piston 194 is moved to the left in cylinder 192 by means of air pressure supplies through conduit 198. Conduit 198 includes an air pressure adjustment mechanism 200 and is connected to the air pressure source through actuator valve 78. Conduit 198 is in parallel with a conduit 202 which leads to the normally open port in valve 190.

The operation of this valve system in order to produce a timed air pulse at the inlet of oil dispensing valve 82 is as follows: When cam 110 is actuated and valve 78 is opened, air pressure is provided through conduits 198 and 202. Air pressure passing through conduit 202 passes through the valve and to the inlet port of oil dispensing valve 82. Air passing through conduit 198 is received on the right hand side of piston 194 and moves the piston against the resilient biasing force of a return spring 204 until the piston engages actuating button 196 and moves the valve to its closed position. The operation of the air pressure through conduit 198 in order to close the valve is a delayed reaction phenomenon, which permits air to flow through the normally open valve 190 for a predetermined period of time until piston 194 moves to the left and turns the valve off. Adjustment in the duration of the air pulse permitted to pass through this valve is provided by means of pressure adjustment mechanism 200. By reducing the flow through conduit 198 to cylinder 192, the time delay before the pulse is shut off is prolonged. By increasing the flow of air through conduit 198, the time delay is decreased.

Still another embodiment of an air valve mechanism is shown in FIG. 14. In that embodiment, the cam actuating mechanism for the air valve is the same as the other embodiments and is therefore shown only in blockform. The embodiment of FIG. 14 employs an air valve as a pilot valve as in FIG. 7 (the air valve being in series with the main air supply to the meter valve in FIG. 8), but the pilot valve is a four-way valve 137 instead of the three-way valve of FIG. 7. The extra outlet of four-way valve 137 leads through a conduit 139 to an air actuator of a two-way vent valve 141. The vent valve has a closed and an open position and is biased to be normally closed. The vent valve is connected to an air reservoir 143 by a conduit 145. Air reservoir has an adjustable volume and is in communication with the inward side 147 of the air actuator 136 for timed pulse valve 80.

The purpose and significance of these additional elements are as follows: The embodiment shown in FIG. 7 is satisfactory for many speeds of operation but some problems develop at high rates of actuation, principally at rates of actuation above 56 operations per minute (ie. a 3 inch chain moving 28 feet per minute). At these speeds, pressure builds up on the inward side 147 of piston 138 and impairs the actuation of the timed pulse valve. This is due to the fact that there is insufficient time for this air to escape from the chamber through opening 142 in the piston before the valve is re-actuated.

To alleviate this problem, the apparatus of FIG. 14 provides a means for venting the air actuator each time the pilot valve is actuated. When four-way valve is deactuated, air pressure actuates vent valve 141, which vents chambers 143 and 147. When the pilot valve is actuated, vent valve 141 is closed and pressure builds up in chambers 147 and 143. This continues until the pressure is sufficient to shut the timed pulse valve off. The air chamber delays the speed at which pressure builds up in chamber 147 and therefore prolongs the pulse transmitted through the timed pulse valve. The volume of chamber 143 can be made adjustable so as to be able to adjust the length of the pulse as desired.

Figure 9A:
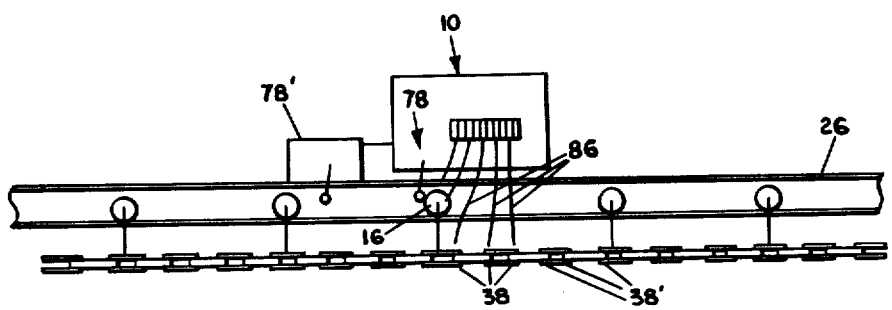
FIGS. 9a and 9b are schematic block diagrams showing the use of a second actuator valve in the present invention in order to lubricate two different sets of chain pins with the same set of oil dispensing units.
Figure 9B:
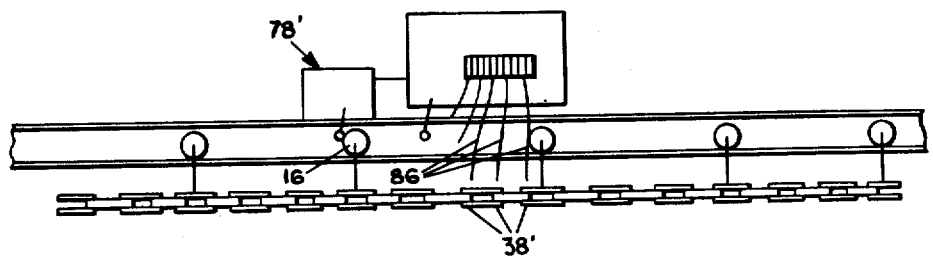

Another important feature of the present invention is disclosed in schematic form in FIG. 9a and 9b. The apparatus shown in these figures is substantially the same as the apparatus as shown in FIG. 1, with two forward oil dispensing units being adapted to lubricate wheels on each side of the I-beam and three rear oil dispensing units being adapted to oil three of the six chain pins in the section of chain joining the separate trolleys. An additional feature provided in this embodiment of the present invention is the incorporation of a second actuator valve 78' for providing lubrication for the other three chain pins in the length of chain interconnecting the successive wheeled trolleys.

In FIG. 9a, the main cam actuator valve 78 is shown being actuated by a wheel 16 on the trolley. The hydraulic and pneumatic circuitry is set up so that the actuation of this actuator causes oil to be dispensed from all five oil dispensing valves, thus lubricating both wheels of the trolley and the three chain pins 38 immediately following the trolley. At this point, no lubrication is provided for the following three chain pins in the chain interconnecting the trolleys.

As the trolley moves along the track, the same wheel 16 subsequently engages the cam actuator of secondary actuator valve 78'. At this point, the three oil dispensing units for the chain pins are positioned adjacent the three rear chain pins 38'. The actuation of secondary 78' causes lubrication to be dispensed from only the three chain pin dispensing units and the trolley lubricators are retained in a deactuated position.

The advantage of this type of system is that a necessity for three additional oil dispensing valves is obviated by the addition of a single additional actuator valve.

Figure 10:
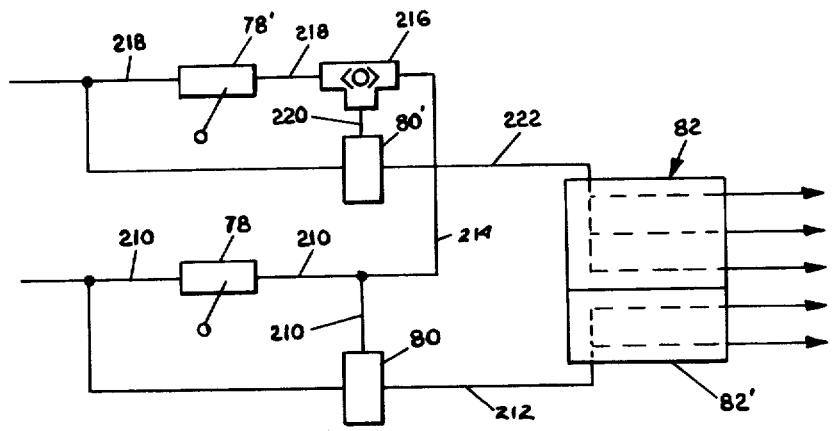
FIG. 10 is a schematic diagram showing the pneumatic circuit employed in the system shown in FIGS. 9a and 9b.

The pneumatic circuitry employed in the embodiments shown in FIGS. 9a and 9b is shown schematically in FIG. 10. As shown in that figure, a first branch 210 extends from the air supply source (not shown) through cam actuated pilot valve 78 through timed pulse valve 80 and then to branch 212 leading to the meter valves 82' for the wheels. A second branch 214 connected to branch 210 between valves 78 and 80 leads to a three way check valve 216. Air passing through this conduit can pass through this check valve to an outlet conduit 220 leading to a second timed pulse valve 80'. Air passes from this timed pulse valve via conduit 222 to the chain pin metering valves 82.

The forward or secondary actuator assembly 78' is connected to the air pressure source through conduit 218. Conduit 218 leads from valve 78' through the second inlet of check valve 216. Air passing through conduit 218 also can pass through the check valve and then through pulse valve 80' to outlet conduit 222 leading to the chain pin metering valves 82.

Figure 11:
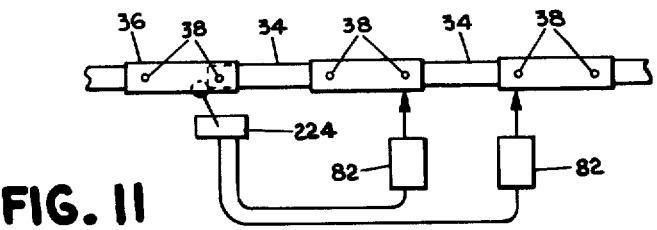
FIG. 11 is a schematic block diagram showing a top view of a number of links in a chain interconnecting wheeled trolleys, with the lubricator of the present invention employed solely for the purpose of lubricating the chain pins.

From the foregoing description, it can be seen that when pilot valve 78 is actuated, air pressure is supplied to all five oil dispensing units, thus lubricating both trolley wheels and the first three chain pins 38. When the second pilot valve 78' is actuated, air pressure is provided only to the chain pins and not to the trolley wheel. With this circuit, savings are realized by reducing the number of oil dispensing valves necessary for this system. FIGS. 11-13, and 15 are a series of schematic plan view diagrams showing the use of the present invention solely as a chain pin lubricating device. In FIG. 11, the basic pneumatic circuitry is shown in schematic form. When the device is used simply for lubricating chain pins, it is desirable to actuate the lubricating device by engagement of a cam operated actuator valve 224 directly with the links of the chain. Actuator valve 224 is shown only in block form in the figure. This valve desirably includes the same types of components that are employed in the actuator valves described above. Thus, valve 224 preferably incorporates both a cam operated actuator valve and a timed pulse valve similar to valves 78 and 80 employed in the foregoing embodiments.

Although any number of oil dispensing means could be employed with this embodiment of the present invention, two oil dispensing valves 82 (including the air assist mechanism) connected in parallel to actuator valve 224 are sufficient for lubrication of all of the chain pins in the chain. The actuator valve is positioned so that it is actuated each time a solid link moves past the actuator, and this causes oil dispensing valves 82 to lubricate the two chain pins in next solid link in the chain. Thus, all of the chain pins are lubricated as the chain moves along the rack.

Figure 12:
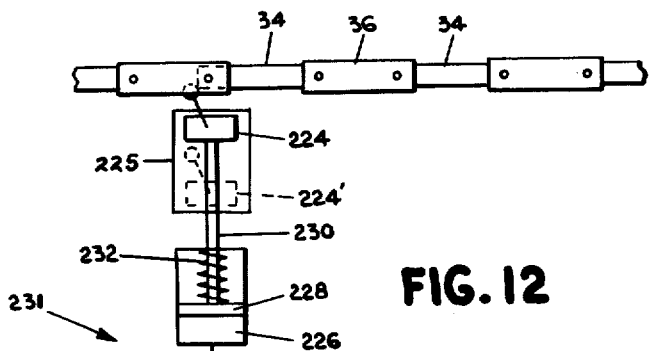
FIG. 12 is a schematic block diagram showing a top view of a number of links in a conveyor chain and showing means for moving the actuator of the present invention into and out of actuating engagement with the links in the chain.

Another feature employed in the present invention, which is particularly desirable when the present invention is used as a chain pin lubricator, is shown in FIG. 12. The feature shown in FIG. 12 is an actuating mechanism 231 for selectively actuating and deactuating the chain pin lubricator. This makes it possible to lubricate the chain pins periodically as desired. In this embodiment, actuator 224 is mounted on a frame 225 for movement from a first position, wherein the actuator is in an engaging position with respect to the chain, to a second position, designated by numeral 224', wherein the actuator is moved out of engaging position with repsect to the chain. The movement of the actuator is effected by means of an air operated drive cylinder 226, which includes a reciprocally mounted piston 228. Piston 228 is connected to actuator 224 by means of an output shaft 230, such that movement of the piston in the cylinder toward and away from the chain causes a corresponding movement of actuator 224 into and out of engagement with the moving chain in the conveyor assembly. A resilient biasing means 232 in the cylinder bears against piston 228 and urges it toward its deactuated position.

The actuator can be moved to its actuated position by applying air pressure to the outer surface of piston 228 through conduit 234. This is effected by means of a pressure source 236 (which may be the same pressure source used for all of the components of the present invention) and a pressure regulator 238.

The system shown in FIG. 12 for moving the actuator valve into and out of engagement with the chain also provides an important safety feature for the present invention. If the chain happens to carry with it some obstruction that comes in contact with the cam actuator, the obstruction does not bend the pivotable cam arm, but merely urges the cam actuator out of its engaging position.

It should be noted that only the actuator is shown in FIG. 12; the oil dispensing means are the same as in FIG. 11.

Figure 13:
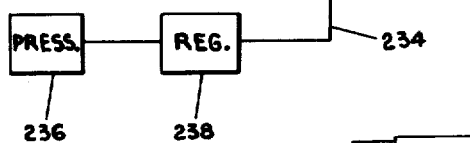
FIG. 13 is a schematic block diagram similar to FIG. 12 and showing the use of an air counter in order to automatically actuate and deactuate the lubricating device once each predetermined number of cycles of the conveyor mechanism around the track.
Figure 13:
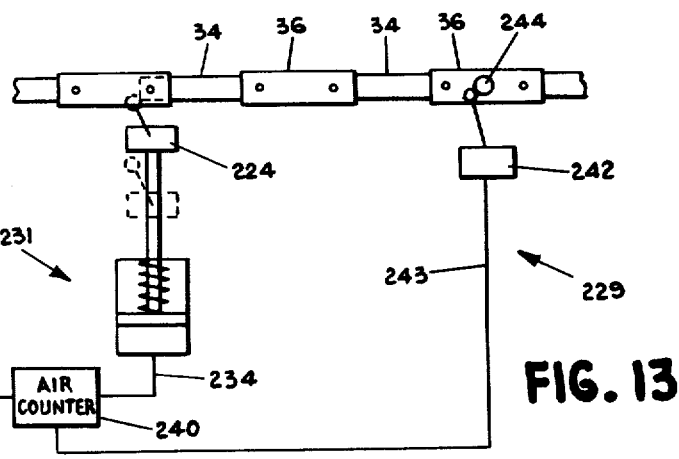

A further feature of the actuation mechanism of the present invention, which is shown in FIG. 13, is an automatic timing mechanism 229 for actuating and de-actuating the lubricating device automatically in any predetermined sequence. Timing mechanism 229 includes the same actuating mechanism 231 as described above for moving the actuator 224 into and out of an engaging position with respect to the chain of the conveyor. The same pressure source 236 and pressure regulator 238 as described above also are employed for driving the actuating mechanism. The additional feature included in this embodiment is an air counter mechanism 240 connected in the air pressure regulator inlet line 234. Air counter 240 is a conventional component that is readily available commercially. Air counter 240 receives an input signal from a cam actuated air pilot valve 242 through conduit 243. Air pilot valve 242 is actuated by a suitable projection or dog 244 which is fastened to one of the trolleys supporting the chain, such that the dog causes actuation of pilot valve 242 once each cycle of the conveyor chain around the track. Each time air pilot valve 242 is actuated a pilot signal is generated, and the signal is sensed by air counter 240. Air counter 240 is actuated each time it senses a predetermined number of signals from the pilot valve, to move valve 224 to actuating position once every predetermined number of cycles of the chain. The air counter is adjustable to vary the number of cycles of the chain around the track between each lubrication cycle. This provides wide variation of the lubrication frequency possible with the present invention and makes it possible to employ the lubricator of the present invention in a wide variety of situations requiring different amounts of lubrication for the chain pins.

Figure 15:
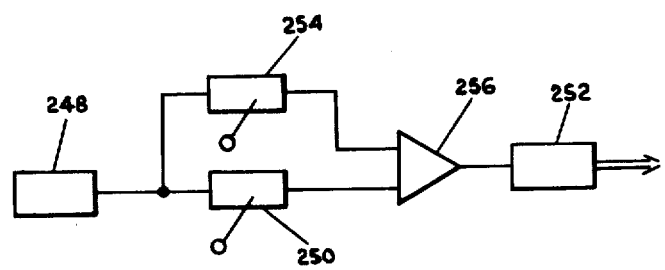
FIG. 15 is a schematic diagram showing the use of a pneumatic AND gate to selectively control the actuation of the lubrication of the present invention.

Another type of air counter mechanism is shown in schematic block form in FIG. 15. In that figure, a pressure supply 248 is connected through an actuation valve assembly 250 of the type described above and shown in FIG. 7, 8, or 14 to an oil metering valve and air assist mechanism 252. Thus far, the system is the same as above. The difference is that an air counter 254 is connected in parallel to the actuator valve assembly, and the outputs of both are fed through a pneumatic AND gate 256, whereby no actuating signal reaches the oil dispensing and air assist mechanisms unless positive signals are received from both the air counter and the actuator mechanism. The air counters can be adapted to engage a projection on the chain once every cycle and generate a positive signal every predetermined number of signals. When the positive signal is present, the output signals from the actuator mechanism are transmitted to the oil dispensing and air assist mechanisms.

Although the actuating mechanism and air counter are shown in FIG. 11-13 in connection with the use of the present invention for a chain pin lubricator, it is contemplated that same type of device could be used in the trolley lubricating mechanism shown in FIG. 1.

Figure 17:
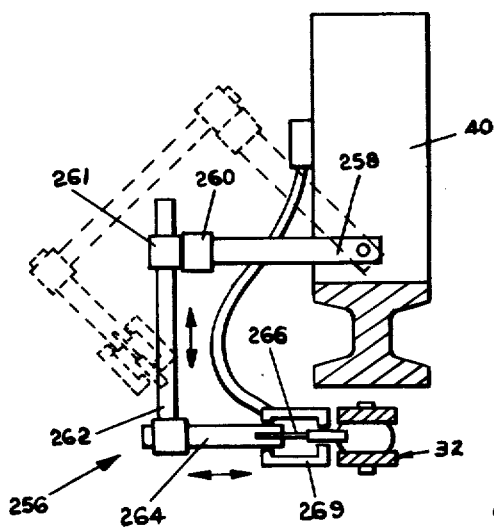
FIG. 17 is a view taken along lines 17 — 17 of FIG. 16.
Figure 16:
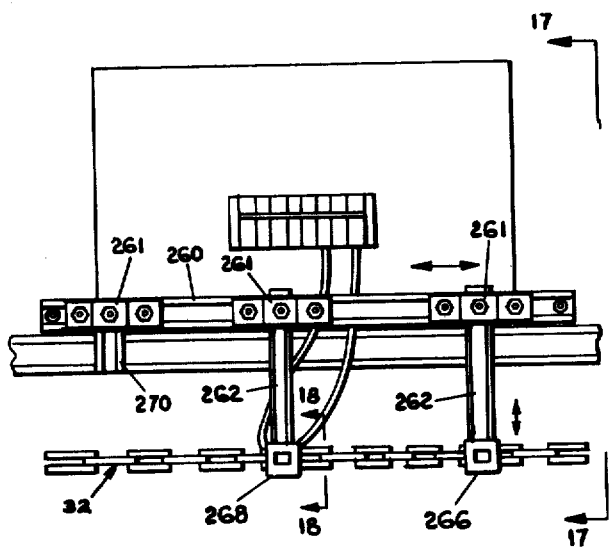
FIG. 16 is a schematic drawing showing an elevational view of the pivotable framework of the present invention employed for mounting the chain pin lubricating component.
Figure 18:
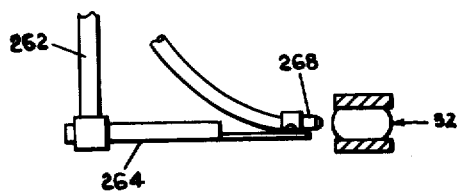
FIG. 18 is a view taken along lines 18 — 18 of FIG. 16.

Another feature of the present invention is shown in FIGS. 16–18. In these figures, the lubricator is being used as a chain pin lubricator either alone or in combination with a trolley lubricator. To provide for accurate positioning of the components while still permitting the components to be swung away from the chain easily, the chaim pin actuation cam and the oil outlet nozzle are mounted on a framework 256 which is pivotably mounted on housing 40. Framework 256 comprises upper horizontal arms 258 pivotably mounted to the ends of housing 40 and extending outwardly therefrom. A horizontal, fixed rail 260 extends longitudinally between the outer ends of the arms. Mounting brackets 261 are slidably mounted on the rail and vertical supports 262 extend downwardly from the mounting brackets. The vertical supports are selectively slidable in the mounting brackets in order to permit height adjustment of the apparatus.

As shown in FIG. 17, the framework pivots easily away from the chain to permit access to the chain and the lubricator.

Lower arms 264 are mounted at the lower ends of vertical supports 262 and extend inwardly to the chain 32. These arms are longitudinally slidable with respect to vertical supports 262. A cam actuator 266 is mounted on the end of one lower arm and oil outlet nozzles 268 are mounted on the end of another lower arm. A shield 269 protects the cam from damage from contact with the chain.

In addition, a forward vertical support and lower arm assembly 270 can be provided in order to provide a mounting means for the air counter or other such component.

It should be understood that the embodiments described herein are merely exemplary of the preferred practice of the present invention and that various modifications or changes may be made in the arrangements and details of construction of the embodiments disclosed herein, without departing from the spirit and scope of the present invention.

The embodiments of the invention in which an exclusive property or privilege is claimed are defined as follows:

1. Conveyor lubricating means for lubricating moving parts of a conveyor mechanism wherein a series of interconnected wheeled trolleys ride along a track, said lubricating means comprising:
   oil supply means for supplying liquid lubricant to the lubricating means;
   actuator valve means for controlling the flow of pressurized air to the lubricating means, said actuator valve means having inlet means for receiving air from an air supply means and outlet means for delivering air from the actuator means to the lubricating means, said actuator valve means having an open position wherein air is permitted to flow to the lubricating means and a closed position wherein the flow of air to the lubricating means is blocked;
   oil dispensing valve means having air inlet means for receiving pressurized air from the outlet means of the actuator valve means, oil inlet means for receiving liquid lubricant from the outlet of the oil supply means, and oil outlet means for delivering liquid lubricant from the oil dispensing valve means, said oil dispensing valve means being actuated by the receipt of pressurized air through the air inlet means and being adapted to discharge a predetermined quantity of liquid lubricant from the oil outlet means each time the oil dispensing valve is actuated, said oil dispensing means being actuated only once each time the actuator valve means is opened and delivering the same predetermined quantity of liquid lubricant from the oil outlet means regardless of the amount of time the actuator valve remains open before closing, said oil dispensing valve means comprising a hollow housing including an oil chamber of predetermined volume and an air driven plunger slidably mounted in the housing for reciprocation into and out of the oil chamber, the plunger having a predetermined stroke into the oil chamber, the oil inlet and outlet means being formed in the oil chamber, with the oil outlet means including means to prevent liquid lubricant from being drawn back into the oil chamber when the plunger is withdrawn from the oil chamber, said air inlet means being formed in an air chamber adjacent the end of the plunger facing away from the oil chamber such that the introduction of pressurized air into the air inlet means drives the piston into the oil chamber and causes the ejection of a predetermined quantity of liquid lubricant from the oil outlet means, said oil dispensing valve means including resilient biasing means for urging the plunger out of the oil chamber when the air pressure in the air chamber is relieved;

oil conduit means having a conduit inlet connected to the oil dispensing valve oil outlet means and a conduit outlet positioned adjacent a predetermined position on the track, said oil conduit means being adapted to convey liquid lubricant from the oil dispensing valve oil outlet means to said predetermined position when the oil dispensing valve means is actuated;

air assist means for urging mechanically dispensed liquid lubricant from the oil conduit outlet to said predetermined position, said air assist means including air conduit means having an inlet in communication with the outlet means of the actuator valve means and an outlet adjacent said predetermined position and adjacent but not in said oil conduit outlet, said air assist means being adapted to convey pressurized air from the air conduit outlet means over the outside of the oil conduit outlet to said predetermined position when the actuator valve means is open;

nozzle means connected to the outlets of the air and oil conduit means, said nozzle means being formed such that liquid lubricant dispensed from the outlet of the oil conduit is entrained in the air leaving the outlet of the air conduit and urged from the nozzle means to said predetermined position; and actuating means for temporarily opening the actuator valve means each time a part to be lubricated reaches said predetermined position on the track such that liquid lubricant discharged from the nozzle means is deposited on the part.

2. Conveyor lubricating means according to claim 1 wherein the actuator valve means includes timed air pulse valve means for automatically deactuating the air assist means after the air flow caused by the air assist means has been in existence for a predetermined time period, even though the part may still remain in said predetermined position.

3. Conveyor lubricating means according to claim 1 and further comprising a plurality of oil dispensing valve means and air assist means for lubricating different parts of the conveyor system at different predetermined positions along the track, one of said plurality of oil dispensing means and one of said plurality of air assist means being employed at each predetermined position, said actuator means serving to actuate all oil dispensing means and air assist means simultaneously.

4. Conveyor lubricating means according to claim 1 and further comprising a plurality of actuation means for actuating the conveyor lubricating means at different times, such that different moving parts of the conveyor mechanism are in said predetermined position when each actuator means actuates the oil dispensing valve means and air assist means.

5. Conveyor lubricating means according to claim 4 wherein the conveyor lubricating means are adapted to be employed in lubricating a conveyor mechanism wherein a series of wheeled trolleys are interconnected by a chain comprising a series of equally spaced links, with the moving parts to be lubricated being the wheels of the trolleys and the chain pins of the chain, said lubricating means including:

a first set of oil dispensing means and air assist means for lubricating each wheel of the trolley when it reaches a first predetermined position on the track, and a second set of oil dispensing means and air assist means for lubricating at the same time a first portion of the chain pins occupying known positions with respect to the trolley wheels in said first predetermined position; and at least two actuator means, a first actuator means being adapted to actuate the first and second sets of oil dispensing means and air assist means when a trolley wheel is in said first predetermined position, and a second actuator means adapted to actuate only the second set of oil dispensing means and air assist means when said trolley wheel is in a second predetermined position being selected such that a different portion of the chain pins in the chain interconnecting the wheeled trolleys are in position to be lubricated by the second set of oil dispensing means and air assist means when they are actuated by the second actuator means.

6. Conveyor lubricating means according to claim 1 wherein:

the oil and air conduit means include a coaxial conduit extending from the outlet means of the oil dispensing valve means to the nozzle means, with the air being conveyed in the outer conduit and the liquid lubricant in the inner conduit.

7. Conveyor lubrication means according to claim 1 wherein the stroke of the plunger is manually adjustable to vary the predetermined quantity of liquid lubricant discharged from the nozzle means upon each actuation of the oil dispensing valve means, and the air assist means includes adjustable flow control means for varying the air flow through the nozzle.

8. Conveyor lubricating means according to claim 7 wherein the oil dispensing value means is adjustable to vary the quantity of liquid lubricant dispensed from the oil outlet means from a maximum of about one drop of liquid lubricant (about 0.002 cubic inches) to a minimum of one 45th of one drop of liquid lubricant (about 0.0000444 cubic inches).

9. Conveyor lubricating means for lubricating moving parts of a conveyor mechanism wherein a series of interconnected wheeled trolleys ride along a track, said lubricating means comprising:

oil supply means for supplying liquid lubricant to the lubricating means;

actuator valve means for controlling the flow of pressurized air to the lubricating means, said actuator valve means having inlet means for receiving pressurized air from an air supply means and outlet means for delivering the air from the actuator means to the lubricating means, said actuator valve means having an open position wherein air is permitted to flow to the lubricating means and a closed position wherein the flow of air to the lubricating means is blocked, the actuator valve means comprising a mechanically actuated three-way valve including resilient biasing means urging the valve to a normally closed position;

oil dispensing valve means having an air inlet means for receiving pressurized air from the outlet means of the actuator valve means, oil inlet means for receiving liquid lubricant from the outlet of the oil supply means, and oil outlet means for delivering liquid lubricant from the oil dispensing valve means, said oil dispensing valve means being actuated by the receipt of pressurized air through the air inlet means and being adapted to discharge a predetermined quantity of liquid lubricant from the oil outlet means each time the oil dispensing valve is actuated, said oil dispensing valve means being actuated only once each time the actuator valve means is opened and delivering the same predetermined quantity of liquid lubricant from the oil outlet means regardless of the amount of time the actuator valve remains open before closing;

oil conduit means having a conduit inlet connected to the oil dispensing valve oil outlet means and a conduit outlet positioned adjacent a predetermined position on the track, said oil conduit means being adapted to convey liquid lubricant from the oil dispensing valve oil outlet means to said predetermined position when the oil dispensing valve means is actuated;

air assist means for urging dispensed liquid lubricant said predetermined position, said air assist means including air conduit means having an inlet in communication with the outlet means of the actuator valve means and an outlet adjacent said predetermined position, said air conduit means being adapted to convey pressurized air to said predetermined position when the actuator valve means is open;

nozzle means connected to the outlets of the air and oil conduit means, said nozzle means being formed such that liquid lubricant dispensed from the outlet of the oil conduit is entrained in the air leaving the outlet of the air conduit means and urged from the nozzle means to said predetermined position; and actuator means for temporarily opening the actuator valve means each time a part to be lubricated reaches said predetermined position on the track such that liquid lubricant from the nozzle means is deposited on the part, said actuating means comprising:

cam actuator means pivotably mounted in the path of predetermined moving components of the conveyor mechanism, said cam actuator means being pivotable between a deactuated position wherein the actuator valve means is closed, to an actuated position, wherein the actuator valve means is open, the acutator means being normally in its deactuated position but being movable to its actuated position when it engages the moving components of the conveyor mechanism; and a reciprocable plunger means drivingly engaged by the rotation of said cam actuator means to open the actuator valve means, said plunger means including adjustment means for varying the effective length of the plunger means so as to alter the amount of rotation of the cam actuator means necessary before the cam actuator means opens the actuator valve means.

10. Conveyor lubricating means for lubricating moving parts in a conveyor mechanism that rides along a track, said lubricating means comprising:

oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;

air assist means for directing an air flow over but not through the oil outlet and toward said predetermined position, such that said measured quantity of liquid lubricant dispensed mechanically from the oil outlet is thereafter urged by said air flow to said predetermined position; and actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet, said actuator means comprising air valve means for generating an air pulse actuating signal when a part to be lubricated reaches said predetermined position, said air valve means being actuated by engagement of an actuating element with a predetermined component of the moving conveyor mechanism, said actuating signal being maintained for as long as said actuating element remains in actuating engagement with said component of the conveyor mechanism, said air valve means comprising a normally closed three-way pilot valve having inlet means for receiving pressurized air from a suitable source, outlet means for transmitting said air pulse actuating signal from the pilot valve when the pilot valve is open, vent means for relieving the air pressure at the outlet means when the pilot valve is closed, and a resilient biasing means for urging the pilot valve toward its closed position, said actuator means further comprising timed pulse valve means for transmitting pressurized air to operate said oil dispensing means and air assist means, said timed pulse valve means being actuated by said actuating signal from the air valve means and being deactuated so as to shut off the pressurized air whenever the actuating signal is discontinued, said timed pulse valve means further including automatic shut-off means for shutting off the flow of pressurized air to the oil dispensing means and air assist means after a predetermined period of time, even if the actuating signal is still present, said timed pulse valve means comprising a normally closed three-way operator valve having inlet means for receiving pressurized air from said source of pressurized air, outlet means for delivering pressurized air to the oil dispensing means and air assist means when the operator valve is open, vent means for relieving the pressure operator valve is open, vent means for relieving the pressure at the outlet means when the operator valve is closed, and resilient biasing means for urging the operator valve toward its closed position, the automatic shut-off means of said timed pulse valve means being an air-operated timed actuation means for temporarily opening the operator valve when the pilot valve is opened, said timed actuation means being actuated by said air pulse signal to open the operator valve and being deactuated a predetermined time after the pilot valve has been opened if the pilot valve continues to remain open after said predetermined time.

11. Conveyor lubricating means according to claim 10 wherein:
the operator valve includes depressible button means for actuating the timed pulse valve means; and
the timed actuation means comprises a closed chamber mounted over said button means and a piston reciprocably mounted in said closed chamber for movement from an actuated position, wherein the piston engages and depresses the button means, to a deactuated position, wherein the button means is not depressed, the chamber including inlet means adjacent the outer side of the piston facing away from the button means for receiving pressurized air from the pilot valve outlet means, the admission of pressurized air in said inlet means causing the piston to move from its deactuated to its actuated position, the piston comprising air passage means for gradually permitting air to pass through the piston to the other side of the piston so as to gradually equalize the pressure on the sides of the piston, said piston returning to its deactuated position when the differential force on the opposite sides of the piston is less than the resilient biasing force urging the valve to its closed position.

12. Conveyor lubricating means for lubricating moving parts in a conveyor mechanism that rides along a track, said lubricating means comprising:
oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;
air assist means for directing an air flow over but not through the oil outlet and toward said predetermined position, such that said measured quantity of liquid lubricant dispensed mechanically from the oil outlet is thereafter urged by said air flow to said predetermined position; and
actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet;
said actuator means comprising air valve means for generating an air pulse actuating signal when a part to be lubricated reaches said predetermined position, said air valve means being actuated by engagement of an actuating element of the air valve means with a predetermined component of the moving conveyor mechanism, said actuating signal being maintained for as long as said actuating element remains in actuating engagement with said componenet of the conveyor mechanism, the air valve means comprising a normally closed three-way pilot valve having inlet means for receiving pressurized air from a suitable source, outlet means for delivering pressurized air to the timed pulse valve means when the air valve is open, vent means for relieving the air pressure at the outlet means when the air valve is closed, and a resilient biasing means for urging the air valve toward its closed position; and
said actuator means further comprising timed pulse valve means for transmitting pressurized air to operate said oil dispensing means and air assist means, said timed pulsed valve means being actuated by said actuating signal from the air valve means and being deactuated so as to shut off the pressurized air whenever the actuating signal is discontinued, said timed pulse valve means further including automatic shut off means for shutting off the flow of pressurized air to the oil dispensing means and air assist means after a a predetermined period of time, even if the actuating signal is still present, the timed pulse valve means comprising a normally open three-way operator valve having inlet means for receiving pressurized air from the outlet means of air valve means, outlet means for delivering pressurized air to the oil dispensing means and air assist means when the operator valve is open, vent means for relieving the pressure at the outlet means when the operator valve is closed, and resilient biasing means for urging the operator valve toward its open position, said automatic shut off means of the timed pulse valve means including timed deactuation means for automatically closing the operator valve a predetermined time period after the air valve has been opened if the air valve still remains open after said predetermined time period.

13. Conveyor lubricating means according to claim 12 wherein the timed deactuation means includes adjustment means for varying the length of time before the operator valve is automatically closed.

14. Conveyor lubricating means according to claim 12 wherein:
the operator valve includes depressible button means for actuating the operator valve; and
the timed deactuation means comprises a closed chamber mounted over said button means with a piston reciprocably mounted in the chamber for movement from a deactuated position, wherein the piston operator valve remains open, to an actuated position, wherein the piston depresses the button means and the operator valve is closed, said chamber having air inlet means for admitting pressurized air to move the piston from its deactuated to its actuated position, said air inlet means being in communication with the outlet means of the pilot valve through flow control valve means for regulating the rate at which air flows to the chamber inlet means from the pilot valve outlet means, said flow control valve means restricting air flow into the chamber such that a predetermined time elapses before sufficient pressure builds up in the chamber to cause the piston to depress the button means and deactuate the operator valve.

15. Conveyor lubrication means according to claim 14 wherein the flow control valve means is adjustable to vary the time that the operator valve remains open before it is closed by the timed deactuation means.

16. Conveyor lubricating means for lubricating moving parts in a conveyor mechanism that rides along a track, said lubricating means comprising:
 oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;
 air assist means for directing an air flow over but not through the oil outlet and toward said predetermined position, such that said measured quantity of liquid lubricant dispensed mechanically from the oil outlet is thereafter urged by said air flow to said predetermined position; and
 actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet, said acuator means comprising an air valve having depressible button means mounted thereon for actuating the air valve, said actuator means further comprising a mechanical actuating device including:
 a plunger housing mounted over the button means;
 a plunger reciprocably mounted in the plunger housing for movement from a deactuated position, wherein the plunger does not engage the button means, to an actuated position, wherein the plunger engages and depresses the button means, said plunger including an adjustment screw threaded in on end of the plunger, said screw being rotatable with respect to the plunger so as to cause axial movement of the screw with respect to the plunger and a consequent change in the effective length of the plunger; and
 cam means for actuating the plunger, said cam means including pivotable cam arm means mounted in the lubricating means for pivotable engagement with predetermined components of the moving conveyor mechanism, said cam means further including cam plate means attached for pivotal movement with the cam arm means and positioned adjacent the outer end of the plunger so as to engage and actuate the plunger when the cam arm means is pivoted.

17. Conveyor lubricating means according to claim 16 wherein the air valve is a three-way valve having an elongated body and a threaded end, the body having air inlet and outlet ports, with at least one of said ports protruding from the side of the body, the button means for actuating the air valve being mounted in the threaded end of the valve body and said end being threaded into a threaded opening in the plunger housing.

18. Conveyor lubricating means according to claim 17 wherein the length of the cam arm means is adjustable.

19. Conveyor lubricating means for lubricating moving parts in a conveyor mechanism that rides along a track, said lubricating means comprising:
 oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;
 air assist means for directing an air flow over but not through the oil outlet and toward said predetermined position, such that said measured quantity of liquid lubricant dispensed mechanically from the oil outlet is thereafter urged by said air flow to said predetermined position;
 actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet, said actuator means including an actuating element such that the actuator means is triggered to actuate the oil dispensing means and air assist means by engagement of the actuating element of the actuator means with selected moving components of a moving conveyor mechanism;
 mounting means for mounting the actuator means for movement from an actuated position, wherein the actuating element is in position to engage said selected components of the conveyor mechanism, to a deactuated position, wherein the actuating element is not in position to engage said selected components;
 resilient biasing means urging the actuator valve means to its deactuated position;
 selective actuation means for moving the actuator valve means to its actuated position at selected times, said actuator means returning to its deactuated position when this selective actuation means is not activated;
 sensing means for sensing each time the moving conveyor mechanism completes a cycle around the track and generating a control signal in response thereto; and counting means for controlling the actuation of the selective actuation means, said counting means receiving and counting successive control signals emitted from the sensing means and actuating the selective actuation means for one complete cycle out of each predetermined number of cycles of the conveyor mechanism around the track, said counting means being adjustable to vary the frequency at which the selective actuation means is actuated.

20. Conveyor lubricating means for lubricating moving parts in a conveyor mechanism that rides along a track, said lubricating means comprising:

oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;

air assist means for directing an air flow over but not through the oil outlet and toward said predetermined position, such that said measured quantity of liquid lubricant dispensed mechanically from the oil outlet is thereafter urged by said air flow to said predetermined position;

actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet; and framework means for holding the actuator means and oil outlets of the oil dispensing means in their desired positions with respect to the conveyor mechanism, said framework means being pivotably mounted on the lubricating means such that the actuator means and oil outlets of the oil dispensing means can be pivoted away from the conveyor, said framework means including adjustment means for independently varying the position of the actuator means and oil outlets in longitudinal, transverse, and vertical directions with respect to the conveyor.

21. Conveyor lubricating means as claimed in claim 20 wherein the framework means comprises:

upper arms pivotably mounted on each end of the lubricating means and extending horizontally outwardly therefrom;

a horizontal bar attached to and extending between the upper arms;

mounting brackets for the actuating means and oil outlets slidably mounted for selective longitudinal movement along the bar;

vertical supports extending downwardly from each mounting bracket, said vertical supports being selectively slidable in a vertical direction in the mounting brackets;

lower arms slidably mounted on the vertical supports at a position below the upper arms and extending inwardly to inner ends adjacent the conveyor mechanism, said arms being selectively slidable with respect to the vertical supports in a direction transverse to the direction of the conveyor; and mounting means for mounting the actuating means and oil outlets of the oil dispensing means nozzles on the inner ends of the lower arms.

22. Conveyor lubricating means for lubricating moving parts in a conveyor mechanism that rides along a track, said lubricating means comprising:

oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;

air assist means for directing an air flow over but not through the oil outlet and toward said predetermined position, such that said measured quantity of liquid lubricant dispensed mechanically from the oil outlet is thereafter urged by said air flow to said predetermined position;

actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet; and automatic deactuation means for automatically deactuating the lubricating means by means of an air actuated gating device by interrupting the air flow from the actuator means to the oil dispensing means and air assist means at predetermined periodic intervals.

23. Conveyor lubricating means as claimed in claim 22 wherein the selective deactuation means comprises:

counting means for sensing each time the conveyor mechanism completes a cycle around the track, said counting means being actuated once every predetermined number of cycles of the conveyor mechanism around the track, the actuation of the counting mechanism causing an air signal to be generated; and pneumatic AND gate means having an air outlet connected to the oil dispensing and air assist means and having air inlets connected to the actuator means and the counting means, said AND gate means transmitting an air signal to the oil dispensing and air assist means only when air signals are received from both the actuator means and counting means at the same time.

24. Conveyor lubricating means for lubricating moving parts in a conveyor mechanism that rides along a track said lubricating means comprising:

oil dispensing means for dispensing a measured quantity of liquid lubricant on selected moving parts when each such selected moving part reaches a predetermined position on the track, said oil dispensing means including an oil outlet positioned adjacent said predetermined position, said oil dispensing means delivering liquid lubricant from said oil outlet by positive mechanical displacement of the liquid lubricant;

air assist means for directing an air flow over but not through the oil outlet and toward said predetermined position, such that said measured quantity of liquid lubricant dispensed mechanically from the oil outlet is thereafter urged by said air flow to said predetermined position; and actuator means for actuating the lubricating means, said actuator means causing the oil dispensing means to dispense one measured quantity of liquid lubricant from the oil outlet when a moving part to be lubricated reaches said predetermined position, said actuator means also causing the air assist means to direct an air flow over the oil outlet each time liquid lubricant is dispensed from said oil outlet;

said actuator means comprising air valve means for generating an actuating signal when a part to be lubricated reaches said predetermined position, said air valve means being actuated by engagement of an actuating element of the air valve means with a predetermined componenet of the moving conveyor mechanism, said actuating signal being maintained for as long as said actuating element remains in actuating engagement with said component of the conveyor mechanism, the air valve means comprising a resiliently biased four-way pilot valve having inlet means for receiving pressurized air from a suitable source, first outlet means for conveying pressurized air from the pilot valve when the pilot valve is deactuated, second outlet means for conveying pressurized air from the pilot valve when the pilot valve is actuated, and vent means for venting air pressure from each outlet means when pressurized air is not being conveyed through the valve to such outlet means, the pilot valve being resiliently biased to remain in its deactuated position until actuated by the actuator means; and said actuator means further comprising timed pulse valve means for transmitting pressurized air to operate said oil dispensing means and air assist means, said timed pulse valve means being actuated by said actuating signal from the air valve means and being deactuated so as to shut off the pressurized air whenever the actuating signal is discontinued, said timed pulse valve means further including automatic shut off means for shutting off the flow of pressurized air to the oil dispensing means and air assist means after a predetermined period of time, even if the actuating signal is still present;

the timed pulse valve means comprising a normally closed three-way operator valve having inlet means for receiving pressurized air from said source of pressurized air, outlet means for delivering pressurized air to the oil dispensing means and air assist means when the operator valve is open, vent means for relieving the pressure at the outlet means when the operator valve is closed, and resilient biasing means for urging the operator valve toward its closed position, said timed pulse valve means being opened by depressing a button on the operator valve; and the automatic shut off means of said timed pulse valve means comprising an air-operated timed actuation means for temporarily opening the operator valve when the pilot valve is actuated, said timed actuation means including a closed chamber mounted over the button on the operator valve and a piston reciprocably mounted in said closed chamber for movement from an actuated position, wherein the piston engages and depresses the button, to a deactuated position, wherein the button is not depressed, the chamber including inlet means in an outer portion of the chamber adjacent the outer side of the piston facing away from the button for receiving pressurized air from the second outlet of the pilot valve, the admission of pressurized air in said inlet means causing the piston to move from its deactuated to its actuated position, the piston comprising air passage means for gradually permitting air to pass through the piston to the other side of the piston so as to gradually equalize the pressure on the sides of the piston, said piston returning to its deactuated position when the differential force on the opposite sides of the piston is less than the resilient biasing force urging the valve to its closed position, said chamber further comprising an inner portion between the piston and the button, said inner portion including outlet means for relieving air pressure in said inner portion when the timed actuation means is deactuated, said outlet means being vented to atmosphere through a normally closed vent valve means, said vent valve means being operably connected to the first outlet of the pilot valve and being opened to vent the chamber outlet means when pressurized air is received from said first outlet and being closed to prevent venting of the chamber outlet means when the first ouetlet is vented.

25. Conveyor lubricating means as claimed in claim 24 and further comprising air reservoir, means connected between the outlet means of the inner portion chamber and the vent valve means, said air reservoir means permitting increased air flow through the air passage means before the pressure in the inner portion is sufficient to close the operator valve, thereby increasing the time that the operator valve remains open before automatically closing.

26. Conveyor lubricating means as claimed in claim 25 wherein the volume of the air reservoir means is adjustable so as to permit adjustment in the length of time the operator valve remains open before automatically closing.

* * * * *